(No Model.)
M. A. TIPNEY.
DEVICE FOR PRESERVING FRUITS, &c.
No. 313,129. Patented Mar. 3, 1885.
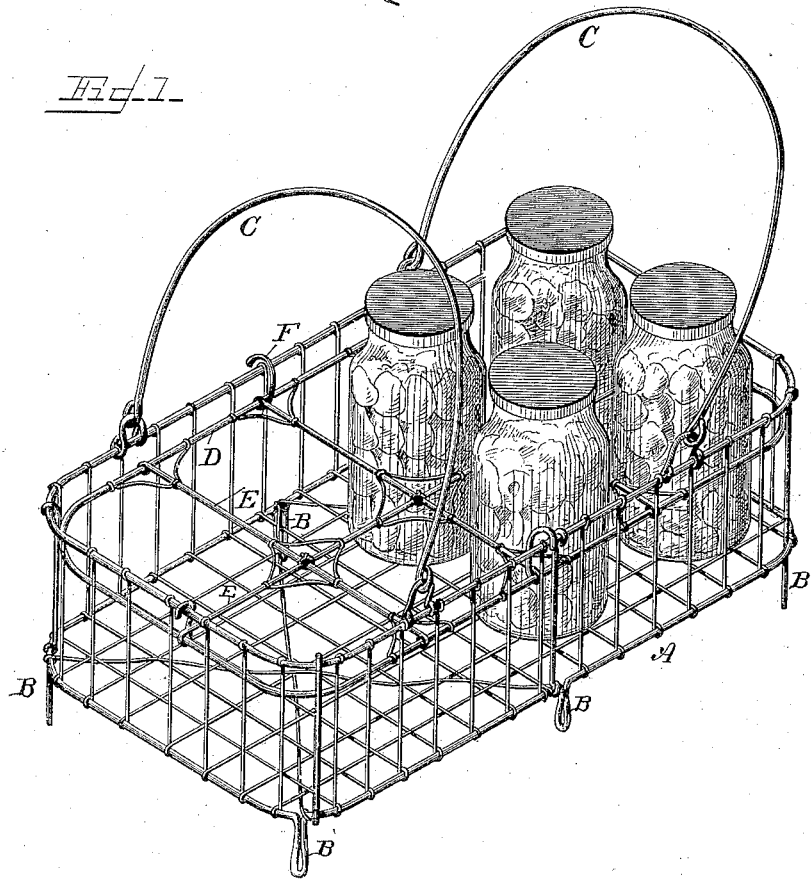
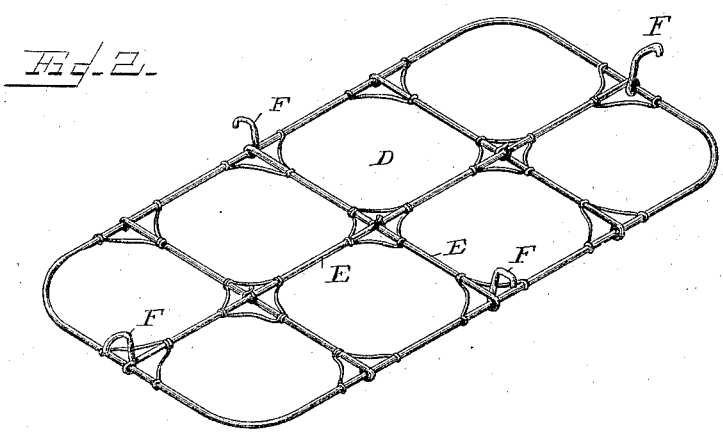
WITNESSES
F. L. Onvand
G. F. Downing
INVENTOR
Mary A. Tipney.
By H. A. Seymour
Attorney

UNITED STATES PATENT OFFICE.

MARY A. TIPNEY, OF JANESVILLE, WISCONSIN.

DEVICE FOR PRESERVING FRUITS, &c.

SPECIFICATION forming part of Letters Patent No. 313,129, dated March 3, 1885.

Application filed November 15, 1884. (No model.)

*To all whom it may concern:*

Be it known that I, MARY A. TIPNEY, of Janesville, in the county of Rock and State of Wisconsin, have invented certain new and useful Improvements in Devices for Preserving Fruits and Vegetables; and I do hereby declare the following to be a full, clear, and exact description of the invention, such as will enable others skilled in the art to which it appertains to make and use the same.

My invention relates to an improvement in devices for preserving fruits and vegetables.

In the process of preserving fruits and vegetables it is customary, after placing the fruit or vegetables in jars, to partially immerse the jars in a boiler containing cold or tepid water. A lid is then placed on the boiler, and the water is then heated while the jars are in the same, thus insuring a gradual and steady rise of temperature, whereby the jars gradually become tempered and not liable to break when the water reaches a boiling point, at which time the jars are entirely surrounded by boiling water and steam. The jars are permitted to remain in the boiler until the contents are thoroughly cooked, at which time they are taken from the boiler, and the tops of the same are immediately secured thereon, whereby the jars are rendered airtight, and, gradually cooling off, the steam therein becomes condensed and leaves a vacuum between the top of the jar and the preserves.

The object of my improvement is to provide a device whereby the usual means for immersing the jars in a boiler may be greatly facilitated by means of a device whereby several jars can be immersed in a boiler simultaneously. A further object is to provide devices by means of which jars of various sizes can be immersed. A further object is to provide a device of the above character which shall be simple and economical in construction and durable and efficient in use; and with these ends in view my invention consists in a wire basket provided with a wire lid or partition whereby the jars located therein are kept from contact with each other.

My invention further consists in the certain features of construction and combinations of parts, as will be hereinafter described, and pointed out in the claims.

In the accompanying drawings, Figure 1 is a view in perspective of my improvement, and Fig. 2 is a view of the lid or partition detached from the basket.

A represents a stand or holder made of wire and provided with the feet B and the handles C, the object of the feet being to prevent the jars from coming in contact with the bottom of a boiler when the same is immersed therein. The bottom of the basket is also made of wire, thus admitting water freely to the jars.

For the purpose of keeping the jars apart while in the basket, I provide a lid or cover, D, provided with the partitions E, adapted to fit within the basket and to hang therein by means of the hooks F.

When it is desired to immerse jars of large sizes, the supplemental wires F are made closer to the partitions E, thus allowing sufficient space therefor. If, on the contrary, small jars are to be immersed, the wires F are located away from the partitions, thereby making the receptacles smaller, whereby the jars are prevented from coming in contact with each other.

I am aware that it is not new to provide a rack or stand adapted to be located within a boiler and provided with a series of boles or openings for supporting a number of cooking utensils, and hence I make no claim thereto.

Having fully described my invention, what I claim as new, and desire to secure by Letters Patent, is—

1. The combination, with a stand or holder made of wire, of a removable partition secured to the top thereof, adapted to separate a set of jars, substantially as set forth.

2. The combination, with a stand or holder made of wire, of a removable frame secured to the top thereof and divided by partitions to receive and separate jars placed in the holder, substantially as set forth.

In testimony whereof I have signed this specification in the presence of two subscribing witnesses.

MARY A. TIPNEY.

Witnesses:
LUCINDA CLEMONS,
JOHN SLIGHTAM.